United States Patent

[11] 3,611,111

| [72] | Inventor | Richard W. Johnston<br>Troy, Mich. |
|---|---|---|
| [21] | Appl. No. | 87,983 |
| [22] | Filed | Nov. 9, 1970 |
| [45] | Patented | Oct. 5, 1971 |
| [73] | Assignee | General Motors Corporation<br>Detroit, Mich. |

[54] INVERTER COMMUTATION VOLTAGE LIMITER
7 Claims, 2 Drawing Figs.

| [52] | U.S. Cl. | 321/45 C, |
| | | 320/1, 321/5 |
| [51] | Int. Cl. | H02m 7/48 |
| [50] | Field of Search | 320/1; |
| | | 321/5, 45, 45 C |

[56] References Cited
UNITED STATES PATENTS

| 3,504,266 | 3/1970 | Schlabach et al. | 321/5 |

FOREIGN PATENTS

| 281,443 | 9/1965 | Australia | 321/45 C |

*Primary Examiner*—William M. Shoop, Jr.
*Attorneys*—E. W. Christen and C. R. Meland ABSTRACT: A voltage-limiting circuit to limit the voltage accumulated on a capacitor. The capacitor is connected serially with a controllable switching device such as a controlled rectifier and an alternating-current source, and energy is transferred from the capacitor through the controlled rectifier to the alternating current source to limit the voltage across the capacitor by gating the controlled rectifier at predetermined times. This voltage limitation system can be used to limit the voltages on commuting capacitors in inverter arrangements which include controlled rectifiers and in this application is useful to ensure against the application of excessive voltages to inverter controlled rectifiers.

PATENTED OCT 5 1971 3,611,111

INVENTOR.
Richard W. Johnston
BY
C.L. Meland
ATTORNEY

INVERTER COMMUTATION VOLTAGE LIMITER

This invention relates to a voltage-limiting circuit wherein energy accumulated on a capacitor is transferred to an alternating-current source through a controlled rectifier to limit the voltage of the capacitor.

Known alternating-current motor drive systems include inverter arrangements to afford control of motor operation. In these systems, the inverter is interposed between a direct current source and the alternating-current motor to convert the direct voltage available from the source to variable frequency alternating voltage to energize the motor. Such arrangements necessitate auxiliary commuting circuitry to terminate conduction of the inverter's power controlled rectifiers at predetermined times. It is generally known to use a capacitor as an energy storage device in the commuting process; but, since the capacitor is continuously connected in the circuit, it can damage inverter controlled rectifiers if the voltage accumulated on the capacitor exceeds the voltage ratings of the controlled rectifiers. It is desirable that a substantial voltage be accumulated on the commuting capacitor for commutation. The instant invention contemplates limiting the maximum voltage accumulated on the various commuting capacitors to preclude controlled rectifier destruction.

To accomplish the desired voltage, limiting, an auxiliary voltage-limiting circuit is included in the inverter wherein a controllable switching device such as a controlled rectifier and an alternating-current source are connected serially across a capacitor whose voltage is to be limited. Inasmuch as the alternating-current source provides a continuously varying voltage level, it should be appreciated that the capacitor can be discharged by the controlled rectifier through the alternating-current source during those time intervals in which its voltage exceeds and opposes the voltage of the source. Commutation of the controlled rectifier is inherent and occurs when the voltage of the alternating-current source exceeds the voltage of the capacitor. This is the basis of the present invention, and this voltage-limiting circuit is connected in the inverter arrangement to limit or clip the commuting capacitor voltage.

As noted above, it is desirable that the commuting capacitors be charged to a substantial voltage for commutation. In the system of the present invention, a predetermined maximum or clipping voltage is set by the inclusion of a bias voltage source connected in the voltage-limiting circuit to provide a reference voltage level. In this manner, the commuting capacitors can charge to predetermined voltage level without being affected by the voltage-limiting circuitry. To limit the commuting capacitor voltage, a second capacitor, termed a voltage-limiting capacitor, is connected in shunt with the commuting capacitor to drain off excessive voltage from the commuting capacitor. To dissipate the voltage of the voltage-limiting capacitor, it is periodically discharged through the alternating-current source. The reference voltage is maintained on the voltage-limiting capacitor and a diode is included in the connection of the two capacitors to ensure the commuting capacitor is unaffected by the limiting circuitry except when the voltage of the commuting capacitor exceeds the voltage of the voltage-limiting capacitor.

Accordingly, it is an object of the present invention to provide a voltage-limiting arrangement for limiting the voltage accumulated on a capacitor wherein a controlled rectifier and an alternating-current source are serially connected across the capacitor and wherein the controlled rectifier is periodically gated conductive to permit energy to be transferred from the capacitor to the alternating-current source.

Another object of the present invention is to provide an inverter arrangement including controlled rectifiers and auxiliary commuting means wherein the commuting capacitors of the auxiliary commuting means are connected with voltage-limiting circuits of the type described to limit the voltage accumulated on the commuting capacitors and to prevent damage to the inverter-controlled rectifiers due to excessive voltages.

It is another object of the present invention to provide a voltage-limiting circuit for limiting the voltage accumulated on a commuting capacitor in the manner described wherein a bias voltage can be applied to a voltage-limiting capacitor to establish a reference voltage level and wherein a diode is included to isolate the voltage-limiting circuitry unless the voltage of the commuting capacitor exceeds the voltage of the voltage-limiting capacitor.

Additional objects and advantages of this invention will be apparent in light of the following description. The figures listed below are incorporated in the description and illustrate a preferred embodiment of the present invention.

Figure 1:
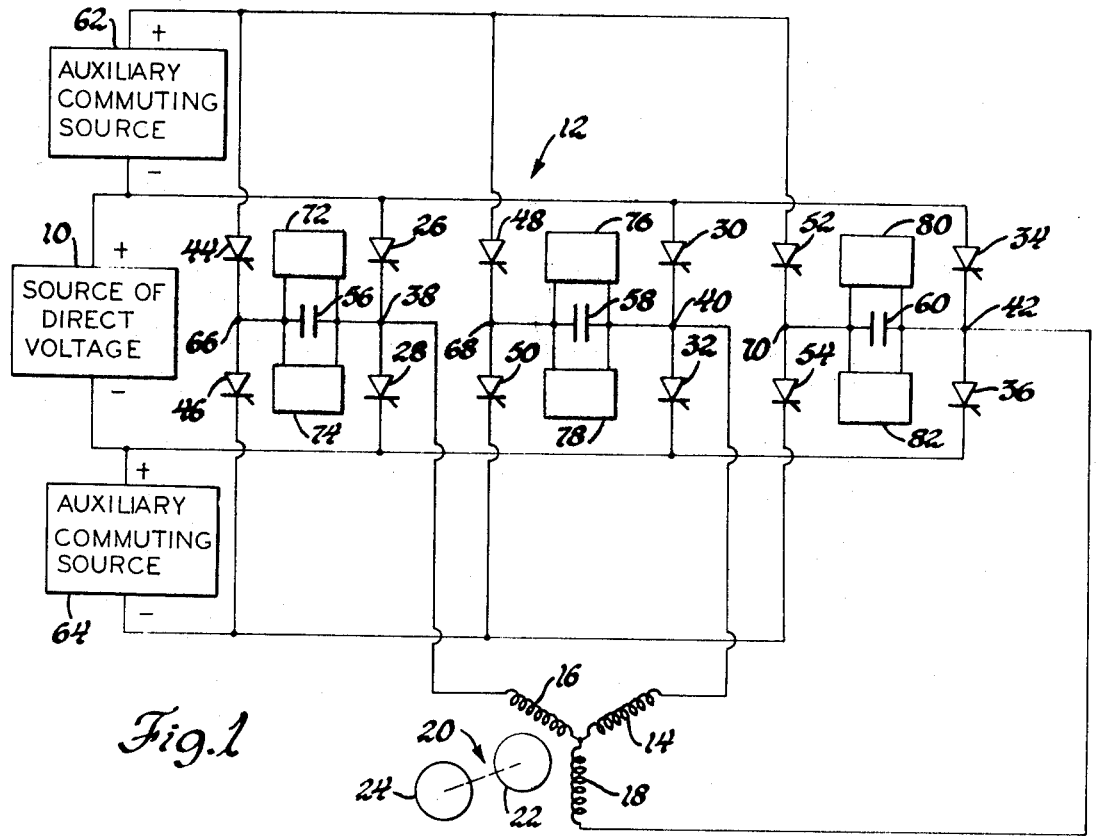
FIG. 1 is a motor control system including an inverter provided with commuting capacitors connected with voltage-limiting circuits made in accordance with the present invention.

Reference should now be made to the drawings and more particularly to FIG. 1 wherein an alternating-current motor control system is disclosed including a source of direct voltage 10 connected with the input terminals of an inverter 12 to feed alternating current to the three-phase windings 14, 16 and 18 of an AC induction motor 20. It is noted that the source of direct voltage 10 can take the form of a variable direct voltage source to provide greater versatility in the control system. The induction motor 20 includes a rotor 22 connected with a load 24. Both the speed and the power available from the rotor 22 an be controlled by varying the voltage from the source 10 and the switching frequency of the inverter 12.

To effect control of the frequency of the voltage supplied to the induction motor 20, the power-controlled rectifiers 26, 28, 30, 32, 34 and 36 are provided gate signals by a variable frequency source of gate signals (not illustrated) according to a predetermined switching sequence. These power-controlled rectifiers 26 to 36 are shown in the drawing connected in three pairs across the positive and negative terminals of the source of direct voltage 10. The three pairs of power-controlled rectifiers provide three output terminals 38, 40 and 42 which are connected with the induction motor phase windings 14, 16 and 18.

In operation, the controlled rectifiers 26 to 36 are conductive in pairs to sequentially energize two of the three motor windings. For example, when power-controlled rectifiers 26 and 36 are operating in their conductive mode, motor phase windings 16 and 18 are energized. One complete energization sequence and the resulting motor operation is more fully disclosed in copending application Ser. No. 42,336, filed June 1, 1970, in the name of Richard W. Johnston, and entitled "Programmed Commuting Power Source for Inverter Motor System." In the resultant motor operation, each motor winding is periodically provided current for 120° intervals separated by 60° lacunas or nonconductive intervals. Each phase winding is supplied alternate positive and negative current pulses depending on which of the pair of controlled rectifiers connected with the winding is conductive.

Since the inverter is provided power from a direct voltage source, auxiliary commutation is necessary. This commutation is accomplished by the six commuting-controlled rectifiers 44, 46, 48, 50, 52 and 54, the three capacitors 56, 58 and 60, and the two commuting direct voltage power sources 62 and 64. The gates of controlled rectifiers 44 to 54 are connected with a source of gate signals (not illustrated) for sequentially gating these controlled rectifiers conductive at the proper times to effect the commutation of controlled rectifiers 26 to 36. As shown in the drawing, the six commuting controlled rectifiers provide three pairs serially connected across the two commuting power sources. These commuting power sources 62 and 64 are in turn connected to opposite terminals of the main source 10. The junctions 66, 68 and 70 of the three pairs of commuting-controlled rectifiers 44 to 54 provide three terminals for connection with the commuting capacitors 56, 58 and 60. The three capacitors 56, 58 and 60 interconnect the three terminals 66, 68 and 70 provided by the commuting controlled rectifiers with the three output terminals 38, 40 and 42 provided by the power-controlled rectifiers.

Each successive commutation is accomplished upon the gating conductive of a particular commuting-controlled rectifier. For example, pursuing the operating condition recited above wherein power-controlled rectifiers 26 and 36 are conductive, the power-controlled rectifier 26 will be rendered nonconductive upon the initiation of conduction through commuting-controlled rectifier 44. Prior to the interval of conduction for power-controlled rectifier 26, commuting capacitor 56 has been charged with a positive polarity at the terminal 38. Accordingly, when commuting-controlled rectifier 44 is gated conductive, the power-controlled rectifier 26 is provided a commuting voltage which causes a reverse bias on the power-controlled rectifier 26 and terminates current flow in this power-controlled rectifier. This voltage is seen from the drawing to be the sum of the voltages of the commuting capacitor 56 and the auxiliary direct voltage power supply 62. After the power-controlled rectifier 26 ceases conduction, the motor phase winding 16 is supplied current through a path which is traced from the positive terminal of the source of direct voltage 10, through the auxiliary power source 62, through the commuting-controlled rectifier 44, through the commuting capacitor 56, through motor windings 16 and 18, and through power-controlled rectifier 36 to the negative terminal of the source 10. In this manner, commuting capacitor 56 is charged such that terminal 66 has a positive polarity and the commuting capacitor is set for the commutation of power-controlled rectifier 28. To maintain continuity of motor operation, the power controlled rectifier 30 is gated conductive at this time.

After controlled rectifier 26 has been nonconductive for 60 electrical degrees, power-controlled rectifier 36 is commuted and power-controlled rectifier 28 is gated conductive. At the end of 120° of conduction by power controlled rectifier 28, commuting controlled rectifier 46 is gated conductive to apply reverse bias commutation voltage to controlled rectifier 28. The commutation voltage applied to power controlled rectifier 28 is the sum of the voltage on the commuting capacitor 56 and the voltage of the commuting power source 64. Upon cessation of current through power-controlled rectifier 28, the capacitor 56 is charged with a positive polarity at terminal 38 through a circuit path traced from the positive terminal of the source 10, through power-controlled rectifier 34, through the motor phase windings 18 and 16, and through the commutation circuit including the commuting capacitor 56, the commuting-controlled rectifier 46 and the commuting source 64 to the negative terminal of the source 10. Accordingly, the commuting capacitor 56 is again set to commute the power-controlled rectifier 26 and one full cycle of operation has been completed. A complete explanation of the commutation circuitry and additional information concerning the commuting power sources is provided in the copending application noted above.

Six voltage-limiting circuits 72, 74, 76, 78, 80 and 82 are included in the inverter arrangement of FIG. 1 to clip the voltages accumulated on the commuting capacitors during operation. This voltage limiting minimizes the possibility of adverse effects which could accompany excessive voltages. For example, the controlled rectifiers shown in the inverter can be destroyed if a voltage in excess of a rated blocking voltage is connected across a nonconductive controlled rectifier. The six commuting capacitor voltage-limiting circuits are identical and accordingly only the two connected with commuting capacitor 56 are discussed in detail. The pair of voltage-limiting circuits 72 and 74 are independent, each limiting the voltage when the capacitor 56 is charged with a particular polarity. In view of the symmetrical character of the particular inverter arrangement of FIG. 1, the voltage maxima selected for both voltage limiting circuits 72 and 74 are the same. In other applications where it is desirable to have equal voltage maxima, the two voltage-limiting circuits can be adjusted to limit at different voltage levels.

Figure 2:
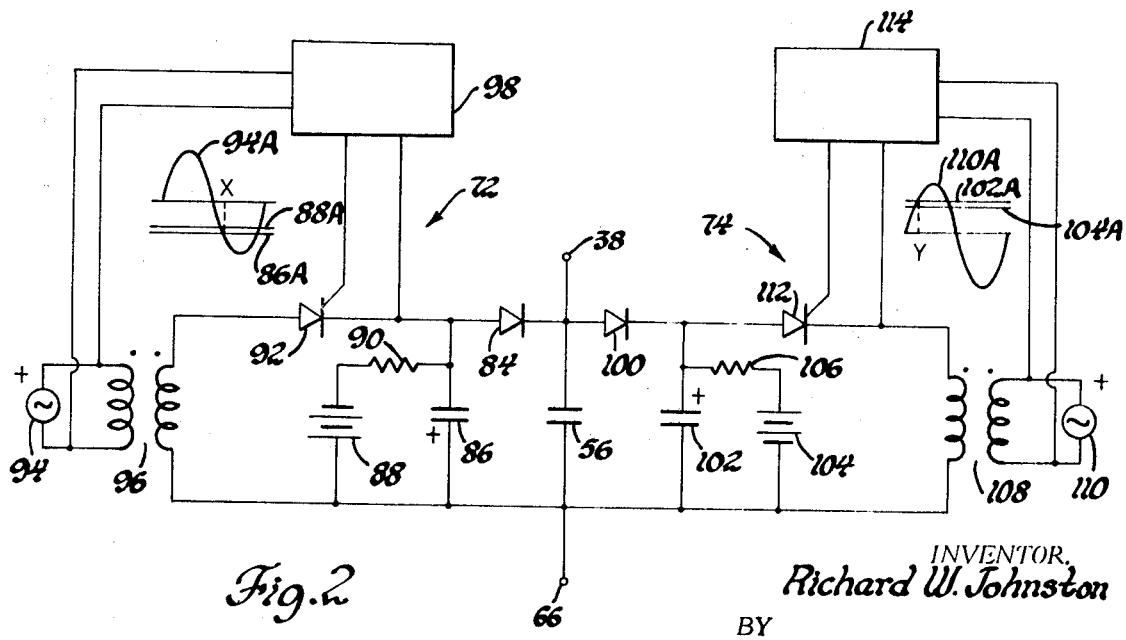
FIG. 2 is a schematic of a single commuting capacitor of the FIG. 1 inverter showing the voltage-limiting circuitry in detail.

In FIG. 2, the voltage clipping or limiting circuits 72 and 74 of FIG. 1 are set forth in detail together with the commuting capacitor 56. The voltage-limiting circuit 72 includes a diode 84, a capacitor 86, a reference source of direct voltage 88, a current-limiting resistor 90, a controllable switching device shown as a controlled rectifier 92, a source of alternating current 94, an isolation transformer 96, and a trigger circuit 98. The diode 84 interconnects capacitor 56 with capacitor 86 and constrains charge transfer therebetween to a single direction. Thus, the limiting circuit 72 is effective to limit the voltage on commuting capacitor 56 during those time intervals in which the terminal 66 is positive with respect to the terminal 38, and it is ineffective when the commuting capacitor 56 is charged such that the terminal 38 is positive with respect to the terminal 66. The capacitance of capacitor 86 is selected to be considerably greater than the capacitance of capacitor 56, and, accordingly, energy or charge transferred to capacitor 56 sufficient to cause a 10-volt increase in the voltage on capacitor 56 will be divided between both the capacitors 86 and 56 and the resultant voltage increase across capacitor 56 will be substantially less than 10 volts, for example on the order of 0.1 volts or less depending on the ratio of the capacitance values of the two capacitors. Typical values for capacitors 56 and 86 are 100 mfd. and 10,000 mfd. respectively.

The reference source of direct voltage 88 is connected with the capacitor 86 through the current-limiting resistor 90 to provide the capacitor 86 with a continuous charge to establish a reference voltage on the capacitor 86 with the polarity indicated in the drawing. This direct voltage source 88 can take the form of a variable voltage source to afford operator control of the reference voltage level. The controlled rectifier 92 connects the capacitor 86 with the alternating-current source 94. In the drawing, this connection is shown as completed through an isolation transformer 96.

A gate control signal is applied to the controlled rectifier 92 at predetermined times by the trigger circuitry 98. Trigger pulses available from the trigger circuitry 98 are synchronized with the voltage of the alternating-current source 94. Trigger circuits of the type required are commercially available and a typical unit is Sprague Model VS 6734 EF. This trigger circuit provides a trigger pulse at any preselected phase angle of the reference input sinusoid and, accordingly, in the connection of FIG. 2 permits the controlled rectifier 92 to be gated at any predetermined phase angle of the voltage from the alternating-current source 94.

Voltage waveform 94A is the sinusoidal output of the alternating-current source 94 assuming the reference polarity indicated. This voltage is connected directly to the trigger circuit 98. If a one-to-one transformer ratio is assumed for transformer 96, then waveform 94A is also the voltage at the secondary winding of the transformer 96 taking into account the polarity marks shown. Of course, it is not necessary that transformer 96 have a one-to-one transformer ratio, but it facilitates this explanation to make that assumption. Superposed on the voltage waveform 94A in the drawing are two additional voltages representing the level of the reference source of direct voltage shown as 88A and the preset maximum commuting capacitor voltage or the clipping voltage level shown as 86A. The voltage levels 86A and 88A are generally close in voltage value; however, the system could be operated with widely divergent values or in certain situations without the reference source of direct voltage 88 and the voltage level 88A.

Voltage limiting is accomplished by discharging the capacitor 86 through the secondary winding of the transformer 96 to transfer the capacitor's energy to the source 94. To accomplish this discharging, the controlled rectifier 92 is gated conductive when the alternating-current source provides a voltage at the secondary winding of transformer 96 in opposition to the voltage on capacitor 86. Thus, controlled rectifier 92 is gated at angle X of the waveform 94A to limit the commuting capacitor voltage to the clipping level shown as voltage 86A. It should be appreciated that the instantaneous voltage of the alternating-current source at the secondary winding of the transformer 96 at the instant of gating is selected as the voltage 86A which exceeds the voltage of reference direct voltage source 88 shown as voltage 88A to preclude draining power from the reference voltage source. When the controlled rectifier 92 is gated conductive, capacitor 86 commences discharging through the secondary winding of transformer 96 to transfer energy to the alternating-current source 94. Of course, the capacitor 86 only discharges if the voltage accumulated on it exceeds the voltage 86A; otherwise, the controlled rectifier 92 senses the fact that the voltage from the alternating-current source is greater than the capacitor voltage and remains nonconductive. Inasmuch as the instantaneous voltage at the secondary winding of transformer 96 is increasing in magnitude, the commuting controlled rectifier 92 will be commuted when the voltage of the capacitor is exceeded by the voltage of the secondary winding to terminate its conductive interval. It is necessary that the controlled rectifier 92 be commuted each cycle to prevent the alternating-current source from charging the capacitor 86 with a polarity the opposite of that shown. It should be appreciated that there is a critical relationship between the maximum voltage permissible on the capacitor 86 and the maximum voltage at the secondary of the transformer 96. In certain circuit arrangements, design considerations may dictate the inclusion of an inductor in series with the controlled rectifier 92 to achieve a desired mode of operation. The consideration relevant to this decision are common to various other circuits and are not discussed here.

The trigger circuit 98 is synchronized to provide a trigger signal to controlled rectifier 92 at the conduction angle X each cycle. This angle is adjustable, and the related maximum voltage or clipping voltage is likewise adjustable. As noted above, the trigger circuit 98 is of conventional design and is commercially available, and, for this reason, it is not described in detail here.

Voltage-clipping circuit 74 operates in the same manner as voltage-clipping circuit 72. This circuit is effective to limit the voltage on commuting capacitor 56 when terminal 38 is positive with respect to terminal 66; clipping circuit 74 is ineffective when the commuting capacitor 56 is charged such that terminal 66 is positive with respect to terminal 38. It is seen that diode 100 permits a unidirectional charge transfer from commuting capacitor 56 to capacitor 102 when the terminal 38 is positive with respect to the terminal 66. The capacitance of capacitor 102 is the same as the capacitance of capacitor 86 and accordingly is substantially greater than the capacitance of commuting capacitor 56. A reference source of direct voltage 104 provides a reference voltage to capacitor 102 by the connection through current-limiting resistor 106. This voltage charges capacitor 102 with the polarity indicated in the drawing. A transformer 108 connects alternating-current source 110 with the voltage-clipping circuit and controlled rectifier 112 determines the intervals of voltage transfer. A trigger circuit 114 synchronized with the voltage available from source 110 provides gating signals to controlled rectifier 112 to render it conductive at predetermined times.

The voltage available from the alternating-current source is shown as voltage 110A in the drawing. Two additional voltages representing the reference source shown as 104A and the clipping level shown as 102A are also included superposed on the sinusoid 110A. Controlled rectifier 112 is gated conductive each cycle at conduction angle Y, and commutation is inherent at the time the instantaneous voltage of the alternating current source 110 exceeds the voltage on the capacitor 102.

It should be appreciated that the alternating-current sources 94 and 110 could in practice be the same source, and, also, a direct connection could be made with the alternating-current source deleting the transformers 96 and 108. Of course, isolation transformers such as 96 and 108 must be included if interaction of the clipping arrangements with other circuitry connected with the alternating-current source is to be avoided. It should be understood that energy returned to the alternating-current source is dissipated in supplying other loads connected with the source which are not indicated in the drawing. To return a greater amount of power to the source, a bridge arrangement and a three-phase alternating-current source could be used. The bridge arrangement would include controlled rectifiers periodically and sequentially gated conductive in the fashion disclosed for the single-phase system.

In summary, the circuit of the present invention clips the voltage of a capacitor to limit the maximum voltage developed on the capacitor. This is accomplished by discharging the capacitor through a controlled rectifier to return the excess energy to an alternating-current source. The controlled rectifier is gated conductive at a predetermined phase angle of the sinusoid of the alternating-current source to determine the maximum voltage or clipping voltage. Commutation of the controlled rectifier is inherent and occurs when the instantaneous voltage amplitude of the alternating-current source exceeds the voltage on the capacitor.

For the commuting capacitor voltage-limiting arrangement of FIG. 2, the direct voltage sources 88 and 104 can be the bridge rectified outputs of alternating-voltage sources. In this situation, current flow through the direct voltage sources 88 and 104 would be unidirectional in view of the rectifiers providing the direct voltage. It should be appreciated that the capacitors 86 and 102 could be shunted by resistors instead of the controlled rectifier, alternating-current source circuits shown in the drawings and described above. The resistors would provide a current bleed path to limit the voltage on capacitors 86 and 102 to enable them to clip or limit the voltage of commuting capacitor 56. This same resistor arrangement could be repeated for commuting capacitors 58 and 60 of FIG. 1 to limit their respective voltages, also.

The above description is merely exemplary and is not intended as a limitation on the capacitor voltage clipping concept of the instant invention. It is appreciated that various modifications and changes could be engrafted on the invention within the scope of the following claims.

1. An electrical system, comprising: a capacitor, an electrical circuit, means connecting said capacitor across said electrical circuit to provide a path for said electrical circuit to transfer energy to said capacitor, a controllable switching device, a voltage source, means connecting said voltage source, said controllable switching device and said capacitor in series circuit, and means connected with said controllable switching device for causing said controllable switching device to be periodically rendered conductive, said capacitor being charged to a voltage of such a polarity from said electrical circuit that it opposes the voltage of said voltage source in said series circuit when said controllable switching device is rendered conductive, said controllable switching device ceasing conduction when the output voltage of said voltage source exceeds the voltage of said capacitor, said capacitor discharging through said controllable switching device and said voltage source when said controllable switching device is conductive during the time said capacitor voltage exceeds the voltage of said voltage source.

2. An electrical system for limiting the voltage on a capacitor comprising: a source of energy, a capacitor, means connecting said capacitor with said source of energy whereby said capacitor is charged from said source of energy, a controllable unidirectionally conducting switching device, a source of alternating current, means connecting said source of alternating current, said switching device and said capacitor in series whereby said capacitor can discharge through said source of alternating current and said switching device when said switching device is biased to a conductive condition and when said capacitor is charged with such a polarity as to discharge through said switching device, and means for gating said switching device to a conductive condition when the voltage of said source of alternating current reaches a predetermined magnitude and has a polarity opposing the voltage on said capacitor whereby, said capacitor can discharge through said source and said controllable switching device when the voltage of the capacitor exceeds the instantaneous voltage of said source of alternating current.

3. An electrical system for limiting the voltage on a capacitor comprising: means for charging said capacitor, a unidirectionally conducting switching device having a pair of current-carrying electrodes and a control electrode, a source of alternating current, means connecting said source of alternating current, the current-carrying electrodes of said switching device and said capacitor in a series circuit, said capacitor being charged with such a polarity that it can discharge through said switching device and through said source of alternating current when said switching device is gated conductive, and means connected with said control electrodes for periodically biasing said switching device to a conductive condition when said output voltage of said source of alternating current reaches a predetermined value and has a polarity opposing the voltage on said capacitor whereby said capacitor can discharge through said source of alternating current and through said switching device when the voltage on said capacitor is in excess of said predetermined value.

4. An electrical system, comprising: a first capacitor, a second capacitor, a reactive electrical circuit, means connecting said first capacitor across said reactive electrical circuit to provide a path for said reactive electrical circuit to transfer energy to said first capacitor, means connecting said second capacitor with said first capacitor to permit unidirectional charge flow from said first capacitor to said second capacitor, said second capacitor having a capacitance greater than said first capacitor whereby, energy transferred from said reactive electrical circuit to said first capacitor is transferred through said connecting means to said second capacitor thus limiting the voltage increase across said first capacitor when said first capacitor has a voltage which exceeds the voltage of said second capacitor, a controlled rectifier, an alternating-current source, means connecting said second capacitor, said controlled rectifier and said alternating-current source in a series circuit, and means connected with said controlled rectifier for rendering said controlled rectifier conductive at a predetermined phase angle of each cycle of the sinusoidal output voltage of said alternating-current source, said second capacitor being charged with a polarity that opposes the polarity of said sinusoidal output voltage of said alternating-current source in said series circuit at said predetermined phase angle, said controlled rectifier being commuted when the sinusoidal output voltage of said alternating-current source exceeds the voltage of said second capacitor, said second capacitor discharging through said alternating-current source when said controlled rectifier is conductive.

5. An electrical system, comprising: a first capacitor an electrical circuit, means connecting said first capacitor across said electrical circuit to provide a path for said electrical circuit to transfer energy to said first capacitor, a second capacitor, a reference direct voltage source, means connecting said reference direct voltage source with said second capacitor to charge said second capacitor to a reference voltage level, a unidirectional device connecting said second capacitor across said first capacitor to permit unidirectional charge flow from said first capacitor to said second capacitor, an alternating current source, a controllable switching device, means connecting said controllable switching device, said second capacitor and said alternating-current source in a series circuit, said second capacitor having a capacitance greater than the capacitance of said first capacitor whereby, energy transferred from said electrical circuit to said first capacitor is transferred through said unidirectional device to said second capacitor limiting the voltage increase across said first capacitor when said first capacitor has a voltage exceeding the voltage of said second capacitor, and means connected with said controllable switching device for gating said controllable switching device periodically conductive to discharge the voltage of said second capacitor in excess of a predetermined voltage level through said alternating-current source, said predetermined voltage level being greater than said reference voltage level to prevent said controllable switching device from drawing power from said reference direct voltage source.

6. A voltage-limiting circuit for use in limiting the voltage of a commuting capacitor used in the commutation of controlled rectifiers included in an inverter arrangement for supplying an AC motor, comprising: a commuting capacitor, a motor winding, means connecting said commuting capacitor across said motor winding to provide a circuit path for said motor winding to transfer energy to said commuting capacitor to charge said commuting capacitor, a clipping capacitor, means connecting said clipping capacitor with said commuting capacitor to permit unidirectional charge flow from said commuting capacitor to said clipping capacitor, a reference source of direct voltage, means connecting said reference source of direct voltage with said clipping capacitor to charge said clipping capacitor to a reference voltage level, said clipping capacitor having a capacitance greater than the capacitance of said commuting capacitor whereby, energy transferred from said motor winding to said commuting capacitor is transferred through said connecting means to said clipping capacitor limiting the voltage increase across said commuting capacitor when said commuting capacitor has a voltage exceeding the voltage of said clipping capacitor, an alternating-current source, a controlled rectifier, means connecting said controlled rectifier, said clipping capacitor and said alternating-current source in a series circuit, and means connected with said controlled rectifier for causing said controlled rectifier to be gated conductive each cycle of the sinusoidal output voltage of said alternating-current source at a predetermined phase angle to discharge the voltage of said clipping capacitor in excess of a predetermined voltage level through said alternating-current source, said predetermined voltage level being greater than said reference voltage level to prevent said controlled rectifier from drawing power from said reference source of direct voltage, said controlled rectifier being commuted by said alternating-current source when the instantaneous amplitude of the sinusoidal output voltage of said alternating-current source exceeds the voltage on said clipping capacitor to thereby preclude energy transfers from said alternating-current source to said clipping capacitor.

7. A voltage-limiting circuit for use in limiting the voltage of a commuting capacitor used in the commutation of controlled rectifiers included in an inverter arrangement for supplying an AC motor, comprising: a commuting capacitor, a motor winding, means connecting said commuting capacitor across said motor winding to provide a circuit path for said motor winding to transfer energy to said commuting capacitor to charge said commuting capacitor, a clipping capacitor, means connecting said clipping capacitor with said commuting capacitor to permit unidirectional charge flow from said commuting capacitor to said clipping capacitor, a reference source of direct voltage, means connecting said reference source of direct voltage with said clipping capacitor to charge said clipping capacitor to a reference voltage level, said clipping capacitor having a capacitance greater than the capacitance of said commuting capacitor whereby, energy transferred from said motor winding to said commuting capacitor is transferred through said connecting means to said clipping capacitor limiting the voltage increase across said commuting capacitor when said commuting capacitor has a voltage exceeding the voltage of said clipping capacitor, and circuit means connected in shunt with said clipping capacitor to provide a discharge path for said clipping capacitor to discharge voltage whereby, the voltage of said clipping capacitor is maintained substantially at the level of said reference voltage and voltage increases resulting from energy transferred from said commuting capacitor are discharged by said circuit means.